United States Patent
Lin

(10) Patent No.: US 7,685,427 B2
(45) Date of Patent: Mar. 23, 2010

(54) SYSTEM AND METHOD FOR LOADING DIGITAL WATERMARKS AUTOMATICALLY

(75) Inventor: Bor-Chuan Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 709 days.

(21) Appl. No.: 11/309,635

(22) Filed: Sep. 1, 2006

(65) Prior Publication Data
US 2007/0174620 A1 Jul. 26, 2007

(30) Foreign Application Priority Data
Jan. 21, 2006 (CN) .......................... 2006 1 0033238

(51) Int. Cl.
*H04L 9/32* (2006.01)
*G06F 17/30* (2006.01)
*G06K 9/00* (2006.01)
(52) U.S. Cl. ................ 713/176; 713/179; 380/28; 380/44; 382/100; 726/26; 726/27
(58) Field of Classification Search ................ None
See application file for complete search history.

(56) References Cited

U.S. PATENT DOCUMENTS

| | | | |
|---|---|---|---|
| 6,683,966 B1 * | 1/2004 | Tian et al. | 382/100 |
| 7,251,047 B2 * | 7/2007 | Meade, II | 358/1.13 |
| 7,274,799 B2 * | 9/2007 | Cohen et al. | 382/100 |
| 7,386,729 B2 * | 6/2008 | Lee et al. | 713/176 |
| 2001/0037455 A1 | 11/2001 | Lawandy et al. | |
| 2003/0172277 A1 | 9/2003 | Suzuki et al. | |
| 2004/0139326 A1 | 7/2004 | Ootsuka et al. | |
| 2005/0015389 A1 * | 1/2005 | Novak et al. | 707/100 |

FOREIGN PATENT DOCUMENTS

| | | |
|---|---|---|
| EP | 1168817 A2 | 1/2002 |
| JP | 2003341155 A | 12/2003 |
| TW | 448397 | 8/2001 |
| TW | 561753 | 11/2003 |

OTHER PUBLICATIONS

San-Yi Huang, Electronic Theses Harvestable and Extensible System, pp. 13-15,Mar. 30, 2005, National Sun Yat-sen University, Twaiwan.

* cited by examiner

*Primary Examiner*—Kaveh Abrishamkar
(74) *Attorney, Agent, or Firm*—Wei Te Chung

(57) ABSTRACT

A system for loading digital watermarks automatically includes an application server (4). The application server includes a main controller. The main controller includes: a document fetching module (401) configured for fetching a document to be printed, and for accessing a document DRM header of the document fetched; a watermark downloading module (402) configured for downloading a digital watermark corresponding to the document; and an integrating module (403) configured for transforming the document into a graphical file and integrating the graphical file with the downloaded digital watermark. A related method is also disclosed.

11 Claims, 3 Drawing Sheets

SYSTEM AND METHOD FOR LOADING DIGITAL WATERMARKS AUTOMATICALLY

FIELD OF THE INVENTION

The present invention relates to a system and method for loading digital watermarks.

The wide spread use of the Internet has increased digital devices and digital multimedia data usages in everyday life. It is relative easy to download digital multimedia data such as digital documents, images, audios, and digital video. It is also easy to modify and create high-quality replicas from the above-mentioned digital multimedia data. Therefore, if copy protection or copy control is not used on the digital multimedia data, there is a danger of illegitimate and illegal replicate of digital multimedia data. Illicit replicas of digital multimedia data must be prevented, and the number of replicas created by authorized users must be restricted. Therefore, protection of intellectual property has become a prime concern for creators and publishers of digitized copies of copyrightable works.

One method of protecting copyrights in the digital domain is to incorporate "digital watermarks". Digital watermarks can be used to mark each individual copy of a digitalized work with information identifying the title, copyright holder, and even the licensed owner of a particular copy.

The digital watermark technique is defined as a technique of embedding specific information into digital data according to a predetermined rule so that the specific information cannot be extracted from the digital data without using at least the predetermined rule. By using this technique, for example, information on a purchaser of image data, etc. is embedded in the image data itself beforehand according to the predetermined rule in such a manner that the information is not visible, and when the image data are illegally replicated, the embedded information is extracted according to the predetermined rule from the data thus illegally copied to specify a person (purchaser) who illegally replicates the data.

However, at present, the digital watermark technique is only applied to digital images, and only detects digital documents placed on the Internet, and does not detect hard copied documents.

SUMMARY

A system for loading digital watermarks automatically includes an application server. The application server includes a main controller. The main controller includes: a document fetching module configured for fetching a document to be printed, and for accessing a document DRM header of the document fetched; a watermark downloading module configured for downloading a digital watermark corresponding to the document; and an integrating module configured for transforming the document into a graphical file and integrating the graphical file with the downloaded digital watermark.

A computer-based method for loading digital watermarks automatically includes the steps of: fetching a document to be printed; accessing a document DRM header of the document fetched, the header comprising a location of a digital watermark corresponding to the document; keeping the document in a temporary file; downloading the digital watermark corresponding to the document; transforming the document kept in the temporary file into a graphical file; and integrating the graphical file with the digital watermark.

Other advantages and novel features of the present invention will become more apparent from the following detailed description of preferred embodiments when taken in conjunction with the accompanying drawings.

DETAILED DESCRIPTION OF THE INVENTION

Figure 1:
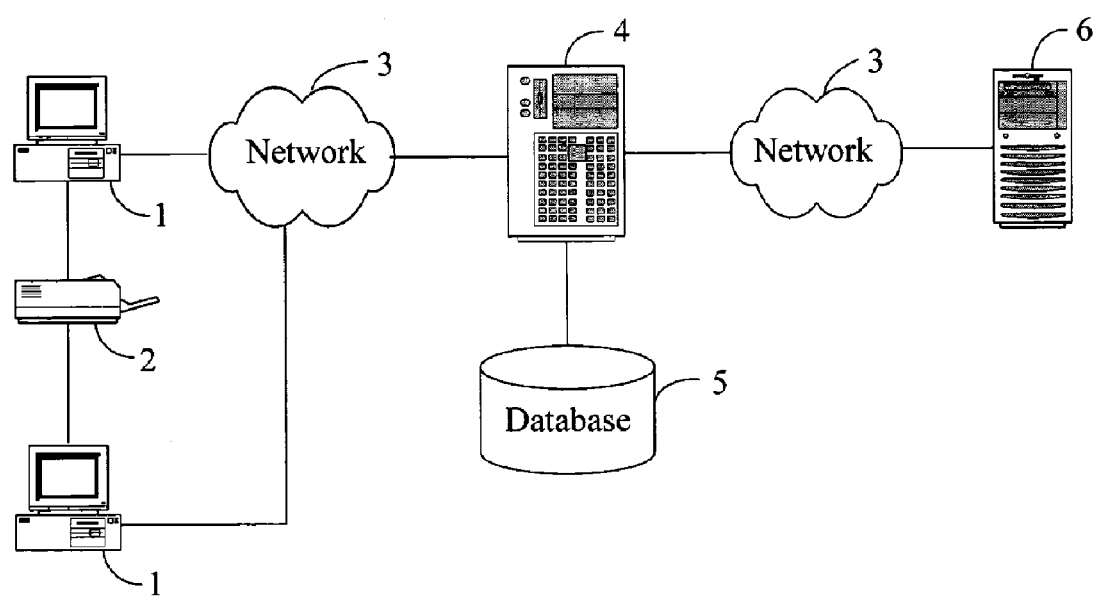
FIG. 1 is a schematic diagram of hardware configuration of a system for loading digital watermarks automatically in accordance with one preferred embodiment.

FIG. 1 is a schematic diagram of hardware configuration of a system for loading digital watermarks automatically in accordance with one preferred embodiment. The system typically includes a plurality of distributed client computers 1 (only two shown), an application server 4, and a remote server 6. The application server 4 connects to the remote server 6 and the client computers 1 through a network 3. The network 3 may be an Intranet or the Internet. The application server 4 further connects to a database 5. In other embodiments, each client computer 1 may also be connected with the database 5.

Each client computer 1 provides a user interface that can be used to access the application server 4 for data input and output. The plurality of client computers 1 may be further connected to one or more printers 2 for printing documents.

The application server 4 is configured for downloading a digital watermark corresponding to a document from the remote server 6, and for integrating the digital watermark in the document for printing.

The remote server 6 is installed with a digital rights management (DRM) software, and stores digital watermarks corresponding to various documents.

Figure 2:
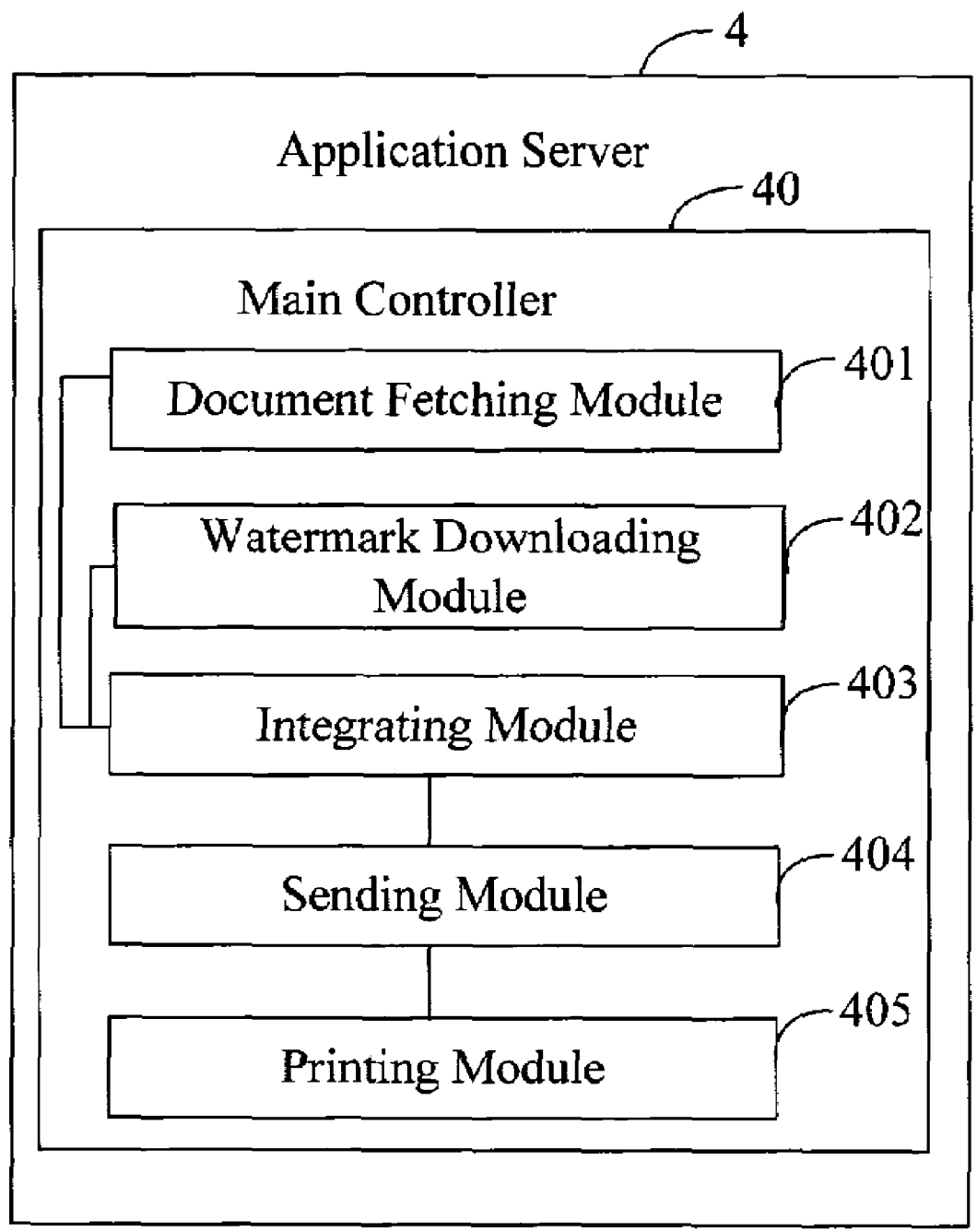
FIG. 2 is a schematic diagram of function modules of an application server in FIG. 1.

FIG. 2 is a schematic diagram of function modules of the application server 4. The application server 4 includes a main controller 40. The main controller 40 includes a document fetching module 401, a watermark downloading module 402, an integrating module 403, a sending module 404 and a printing module 405.

The document fetching module 401 is configured for fetching the document to be printed from the database 5, and accessing a document DRM header of the document fetched. A document DRM header is added in the document when the document is encrypted by DRM. The document DRM header may include information such as: author information, copyright year, a location of a corresponding digital watermark, and a digital object identifier (DOI). The document fetching module 401 is also configured for determining whether the document to be printed has been protected by DRM. If the document includes a document DRM header, the document has been protected by DRM. The document fetching module 401 keeps the document in a temporary file. The document may also be stored in any of the client computers 1 or the remote server 6.

The watermark downloading module 402 is configured for downloading a digital watermark corresponding the document to be printed from the remote server 6 according to a location of the digital watermark in the document DRM header.

The integrating module 403 is configured for transforming the document kept in the temporary file into a graphical file, fetching RGB (red, green and blue) data values of each point in the graphical file and the digital watermark, and making logical operations on the RGB values of each point in order to integrate the digital watermark in the document. The logical operation includes: XOR.

The sending module 404 is configured for sending the document or the graphical file to the printer 2.

The printing module 405 is configured for printing the document or the graphical file through the printer 2.

Figure 3:
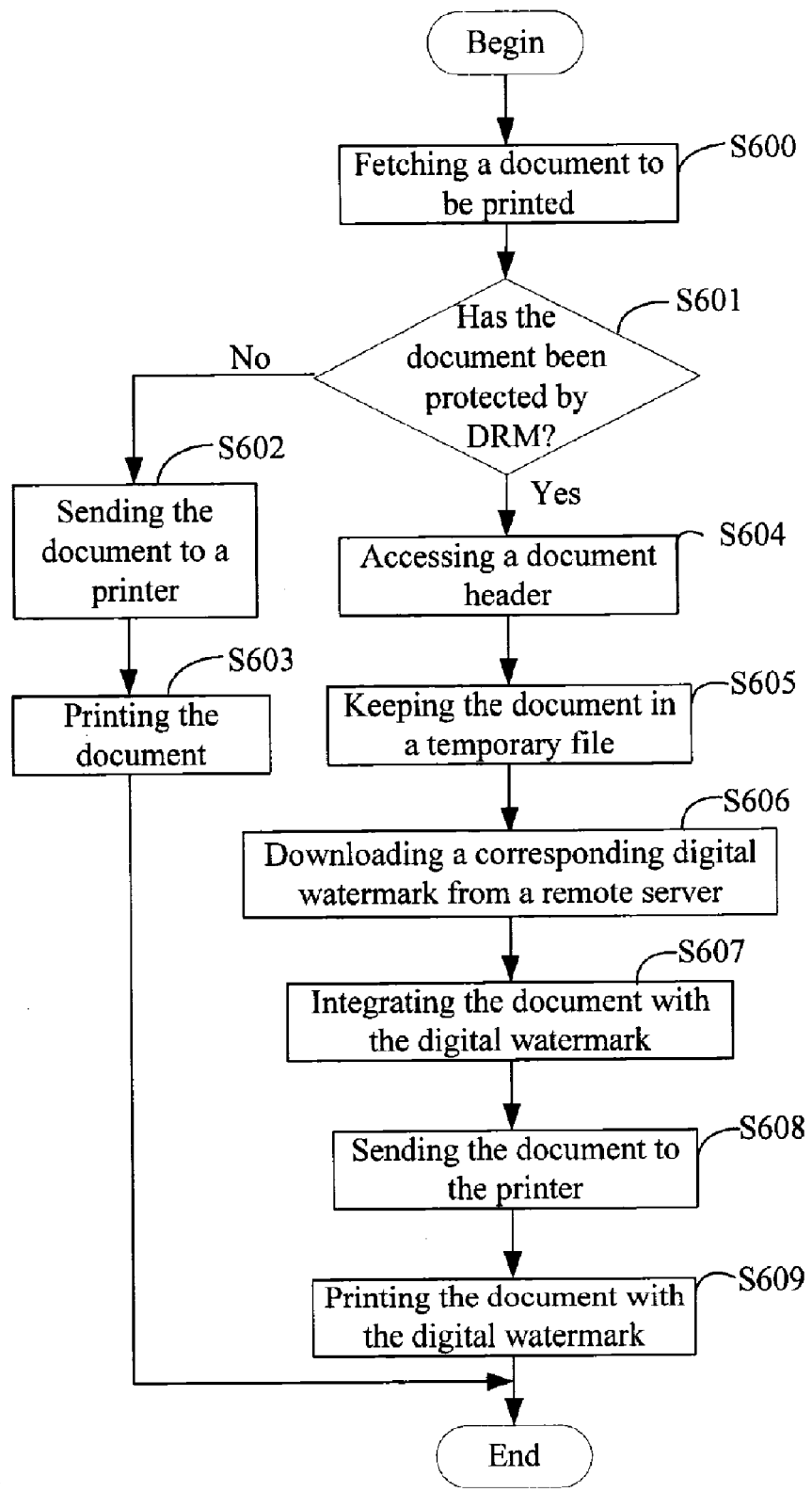
FIG. 3 is a flowchart of a preferred method for loading digital watermarks automatically in accordance with a preferred embodiment.

FIG. 3 is a flowchart of a preferred method for loading digital watermarks automatically. In step S600, the document fetching module 401 fetches the document to be printed from the database 5. In step S601, the document fetching module 401 determines whether the document has been protected by DRM. If the document has not been protected by DRM, in step S602, the sending module 404 sends the document to the printer 2 directly. In step S603, the printing module 405 prints the document via the printer 2.

If the document is protected by DRM, in step S604, the document fetching module 401 accesses a document DRM header of the document fetched, and fetches a print task by calling a function SetWindowsHook( ) from Windows APP. The function SetWindowsHook( ) is configured for hooking messages in the computer system. In step S605, the document fetching module 401 keeps the document to be printed in the temporary file. In step S606, the watermark downloading module 402 extracts the location of a corresponding digital watermark from the document DRM header; the location of the corresponding digital watermark is added in the document DRM header when the document is encrypted with DRM. Then, the watermark downloading module 402 downloads the digital watermark from the remote server 6 via socket or a uniform resource locator (URL) according to the location. In step S607, the integrating module 403 transforms the document kept in the temporary file into a graphical file. The integrating module 403 fetches RGB data values of each point in the digital watermark and the graphical file, and makes logical operations on the RGB values of each point. That is to say, the integrating module 403 integrates the digital watermark downloaded into the graphical file by making logical operations on the RGB values of each point. In step S608, the sending module 404 sends the graphical file with the digital watermark to the printer 2. In step S609, the printing module 405 prints the graphical file integrated with the digital watermark via the printer 2.

It is to be understood that other embodiments may be utilized and structural changes may be made without departing from the scope of the present invention.

What is claimed is:

1. A system for loading digital watermarks automatically comprising an application server, the application server having a main controller, the main controller comprising:
    a document fetching module configured for fetching a document to be printed, and for accessing a document digital rights management (DRM) header of the document upon the condition that the document has been protected by DRM;
    a watermark downloading module configured for downloading a digital watermark corresponding to the document; and
    an integrating module configured for transforming the document into a graphical file, fetching RGB (red, green and blue) values of each point in the graphical file and the digital watermark, and making logical operations on the RGB values of each point in the graphical file and the digital watermark to integrate the downloaded digital watermark with the graphical file.

2. The system of claim 1, wherein the document DRM header comprises: author information, copyright year, a location of a corresponding digital watermark and a digital object identifier.

3. The system of claim 1, wherein the main controller further comprises:
    a sending module for sending the graphical file integrated with the digital watermark to a printer; and
    a printing module for printing the graphical file integrated with the digital watermark.

4. The system of claim 1, wherein the document DRM header is added in the document when the document is encrypted by DRM.

5. The system of claim 1, wherein the logical operations comprise an Exclusive OR (XOR) operation.

6. The system of claim 3, wherein the sending module sends the document to the printer directly for printing if the document has not been protected by DRM.

7. A computer-based method for loading digital watermarks automatically, the method comprising the steps of:
    fetching a document to be printed;
    accessing a document digital rights management (DRM) header of the document upon the condition that the document has been protected by DRM, the header comprising a location of a digital watermark corresponding to the document;
    keeping the document in a temporary file;
    downloading the digital watermark corresponding to the document according to the location;
    transforming the document kept in the temporary file into a graphical file;
    fetching RGB values of each point in the digital watermark and the graphical file; and
    making logical operations on the RGB values of each point in the digital watermark and the graphical file to integrate the graphical files with the digital watermark.

8. The method of claim 7, further comprising the steps of:
    sending the graphical file integrated with the digital watermark to a printer; and
    printing the graphical file integrated with the digital watermark.

9. The method of claim 7, further comprising the step of:
    sending the document to the printer directly for printing if the document has not been protected by DRM.

10. The method of claim 7, wherein the logical operations comprise an Exclusive OR (XOR) operation.

11. The method of claim 7, wherein the document DRM header is added in the document when the document is encrypted by DRM.

* * * * *